(12) United States Patent
Codrescu et al.

(10) Patent No.: US 7,814,487 B2
(45) Date of Patent: Oct. 12, 2010

(54) SYSTEM AND METHOD OF EXECUTING PROGRAM THREADS IN A MULTI-THREADED PROCESSOR

(75) Inventors: Lucian Codrescu, Austin, TX (US); Erich Plondke, Austin, TX (US); Muhammad Ahmed, Austin, TX (US); William C. Anderson, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 1569 days.

(21) Appl. No.: 11/115,917

(22) Filed: Apr. 26, 2005

(65) Prior Publication Data

US 2006/0242645 A1 Oct. 26, 2006

(51) Int. Cl.
*G06F 9/46* (2006.01)
*G06F 11/00* (2006.01)
*G06F 15/00* (2006.01)

(52) U.S. Cl. ................. 718/102; 712/206; 712/225; 714/10

(58) Field of Classification Search ........... 718/102; 712/206, 225; 714/10
See application file for complete search history.

(56) References Cited

U.S. PATENT DOCUMENTS

| | | | | |
|---|---|---|---|---|
| 5,574,939 | A * | 11/1996 | Keckler et al. | 712/24 |
| 6,055,628 | A * | 4/2000 | Seshan et al. | 712/235 |
| 6,170,051 | B1 * | 1/2001 | Dowling | 712/225 |
| 6,363,475 | B1 * | 3/2002 | Dowling | 712/206 |
| 6,523,110 | B1 * | 2/2003 | Bright et al. | 712/239 |
| 6,615,366 | B1 * | 9/2003 | Grochowski et al. | 714/10 |
| 2002/0069345 | A1 | 6/2002 | Mohamed et al. | |

(Continued)

FOREIGN PATENT DOCUMENTS

| EP | 1146420 | 10/2001 |
|---|---|---|
| KR | 2000-0044550 | 7/2000 |

OTHER PUBLICATIONS

Ahang A et al: "The Effects of Explicitly Parallel Mechanisms on the Multi-ALU Processor Cluster Pipeline" Computer Design: VLSI in Computers and Processors, 1998. ICCD '98. Proceedings International Conference on Austin, TX, USA Oct. 5-7, 1998, Los Alamitos, CA USA, IEEE Comput. Soc. US Oct. 5, 1998, pp. 474-481, XP010310318, ISBN: 0-8186-9099-2.

(Continued)

*Primary Examiner*—Meng-Ai An
*Assistant Examiner*—Jennifer N To
(74) *Attorney, Agent, or Firm*—Sam Talpalatsky; Nicholas J. Pauley; Peter M. Kamarchik

(57) ABSTRACT

A multithreaded processor device is disclosed and includes a first program thread and second program thread. The second program thread is execution linked to the first program thread in a lock step manner. As such, when the first program thread experiences a stall event, the second program thread is instructed to perform a no operation instruction in order to keep the second program thread execution linked to the first program thread. Also, the second program thread performs a no operation instruction during each clock cycle that the first program thread is stalled due to the stall event. When the first program thread performs a first successful operation after the stall event, the second program thread restarts normal execution.

38 Claims, 11 Drawing Sheets

U.S. PATENT DOCUMENTS

| | | |
|---|---|---|
| 2003/0088756 A1 | 5/2003 | Vishkin |
| 2004/0172522 A1* | 9/2004 | Biswas et al. ............... 712/225 |
| 2005/0010743 A1* | 1/2005 | Tremblay et al. ............. 712/10 |
| 2005/0050305 A1 | 3/2005 | Kissell |
| 2005/0229018 A1* | 10/2005 | De Oliveira Kastrup Pereira et al. .......................... 713/324 |

OTHER PUBLICATIONS

Jenn-Yuan Tsai et al: "The Superthreaded Architecture: Thread Pipelining with Run-Time Data Dependence Checking and Control Speculation" Parallel Architectures and Compilation Techniques, 1996., Proceedings of Teh 1996 Conference on Boston, MA, USA Oct. 20-23, 1996, Los Alamitos, CA, USA, IEEE Comput. Soc, US, Oct. 20, 1996, pp. 35-46, XP010199378, ISBN: 0-8186-7632-9.

Mendelson A et al: "Designing High-Performance and Reliable Superscalar Architectures-The Out of Order Reliable Superscalar (0ERS) Approach" Dependable Systems aned Networks, 2000. DSN 2000. Proceedings International Conference on New York, NY, USA Jun. 25-28, 2000, Los Alamitos, CA, USA, IEEE Comput. Soc, US, Jun. 25, 2000, pp. 473-481, XP010504358, ISBN: 0-7695-0707-7.

\* cited by examiner

SYSTEM AND METHOD OF EXECUTING PROGRAM THREADS IN A MULTI-THREADED PROCESSOR

BACKGROUND

I. Field

The present disclosure generally relates to digital signal processors and devices that use such processors. More particularly, the disclosure relates to the execution of multiple program threads by a digital signal processor register.

II. Description of Related Art

Advances in technology have resulted in smaller and more powerful personal computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and IP telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can include a web interface that can be used to access the Internet. As such, these wireless telephones include significant computing capabilities.

Typically, as these devices become powerful, programmers may want to develop programs that are increasingly complex, e.g., for video decoding. As programs become increasingly complex, it may be necessary to write parallel programs across two or more threads. However, it can be difficult to execute parallel programs across the two or more threads.

Accordingly it would be advantageous to provide an improved method of executing multiple program threads within a multi-threaded processor.

SUMMARY

A multithreaded processor device is disclosed and includes a first program thread and a second program thread. The second program thread is execution linked to the first program thread in a lock step manner. In a particular embodiment, when the first program thread experiences a stall event, the second program thread is instructed to perform a no operation instruction in order to keep the second program thread execution linked to the first program thread.

Further, in a particular embodiment, the stall event is caused by a cache miss. Also, in a particular embodiment, the second program thread performs a no operation instruction during each clock cycle that the first program thread is stalled due to the stall event. When the first program thread performs a first successful operation after the stall event, the second program thread restarts normal execution.

In another particular embodiment, when the second program thread experiences a stall event, the first program thread is instructed to perform a no operation instruction in order to keep the first program thread execution linked with the second program thread. Further, the first program thread performs a no operation instruction during each clock cycle that the second program thread is stalled due to the stall event. When the second program thread performs a first successful operation after the stall event, the first program thread restarts normal execution.

In yet another particular embodiment, the device further comprises at least one instruction execution unit and the at least one instruction execution unit selectively executes one or more instructions either the first program thread or the second program thread. The device further comprises a stall controller that is coupled to the at least one instruction execution unit. The stall controller is configured to receive a stall event signal from the at least one instruction unit when at least one of the first program thread and the second program thread experiences a stall event. Further, the stall controller is configured to output a signal to cause either the first program thread or the second program thread to perform a no operation instruction in response to the stall event signal.

Also, in a particular embodiment, the stall controller is configured to receive a stall end signal from the at least one instruction unit when one of the first program thread or the second program thread performs a first successful operation after the end of a stall state produced by the stall event. Moreover, the stall controller is configured to output a normal execution signal in response to the stall end signal to cause one of the first program thread or the second program thread to resume a normal execution.

In another embodiment, a multithreaded processor device is disclosed and includes a memory and a sequencer that is coupled to the memory. Further, the device includes a stall controller within the sequencer. Also, the device includes at least a first program thread and at least a second program thread within the memory. In this particular embodiment, the at least second program thread is execution linked to the at least first program thread so that when the at least first program thread experiences a stall event, the at least second program thread is controlled in order to keep the at least second program thread execution linked to the at least first program thread.

In still another embodiment, a method of partitioning a program to operate in a multithreaded processor is disclosed and includes receiving a program having a plurality of very wide very long instruction words (VLIWs). Each VLIW can be includes a plurality of instructions. The method further includes dividing the program into a first portion to be executed as a first program thread and a second portion to be executed as a second program thread.

In yet another embodiment, a method of operating a digital signal processor device is disclosed and includes detecting that a first program thread is execution linked to a second program thread, setting a first program counter to a first instruction of the first program thread and setting a second program counter to a first instruction of the second program thread. Further, in this embodiment, the method includes executing the first program thread in a lock step manner with the second program thread so that each instruction of the second program thread is executed in the same super cycle in which a corresponding instruction of the first program thread is executed.

In still yet another embodiment, a data register to control execution of two or more program threads of a multithreaded processor is disclosed and includes a first thread execution linking register. Further, the data register includes a first field within the first thread execution linking register. The first field is associated with a first program thread. The data register also includes a second field within the first thread linking register. The second field is associated with a second program thread.

In another embodiment, a data register set is disclosed and includes a first thread linking register, a second thread linking register, and a third thread linking register. In this embodiment, each of the thread linking registers includes a first thread bit that is associated with a first program thread, a second thread bit that is associated with a second program thread, a third thread bit that is associated with a third program thread, a fourth thread bit that is associated with a fourth program thread, a fifth thread bit that is associated with a fifth program thread, and a sixth thread bit that is associated with a sixth program thread.

In yet another embodiment, a virtual very wide very long instruction word (VLIW) is disclosed and includes at least a first VLIW and at least a second VLIW that is linked to the first VLIW.

In still another embodiment, a portable communication device is disclosed and includes a digital signal processor. The digital signal processor includes a first program thread and a second program thread. In this embodiment, the second program thread is execution linked to the first program thread, such that when the first program thread experiences a stall event, the second program is controlled to maintain execution linkage to the first program thread.

In still yet another embodiment, a computer code assembler device is disclosed and includes means for receiving a program having a plurality of very wide very long instruction words (VLIWs) and means for dividing the program into a first portion to be executed as a first program thread and a second portion to be executed as a second program thread.

In another embodiment, a digital signal processor device is disclosed and includes means for detecting that a first program thread is execution linked to a second program thread, means for setting a first program counter to a first instruction of the first program thread, and means for setting a second program counter to a first instruction of the second program thread. Further, the digital signal processor device includes means for executing the first program thread in a lock step manner with the second program thread so that each instruction of the second program thread is executed in a super cycle in which a corresponding instruction of the first program thread is executed.

An advantage of one or more embodiments disclosed herein can include dividing a program having a plurality of virtual very wide very long instruction word instructions into two program threads that each have a plurality of very long instruction words (VLIWs).

Another advantage can include executing a first program thread in a lock step manner with a second program thread, such that multiple program threads can be executed in a synchronized manner. This method reduces parallel programming complexity and can improve processor performance.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

The aspects and the attendant advantages of the embodiments described herein will become more readily apparent by reference to the following detailed description when taken in conjunction with the accompanying drawings wherein.

DETAILED DESCRIPTION

Figure 1:
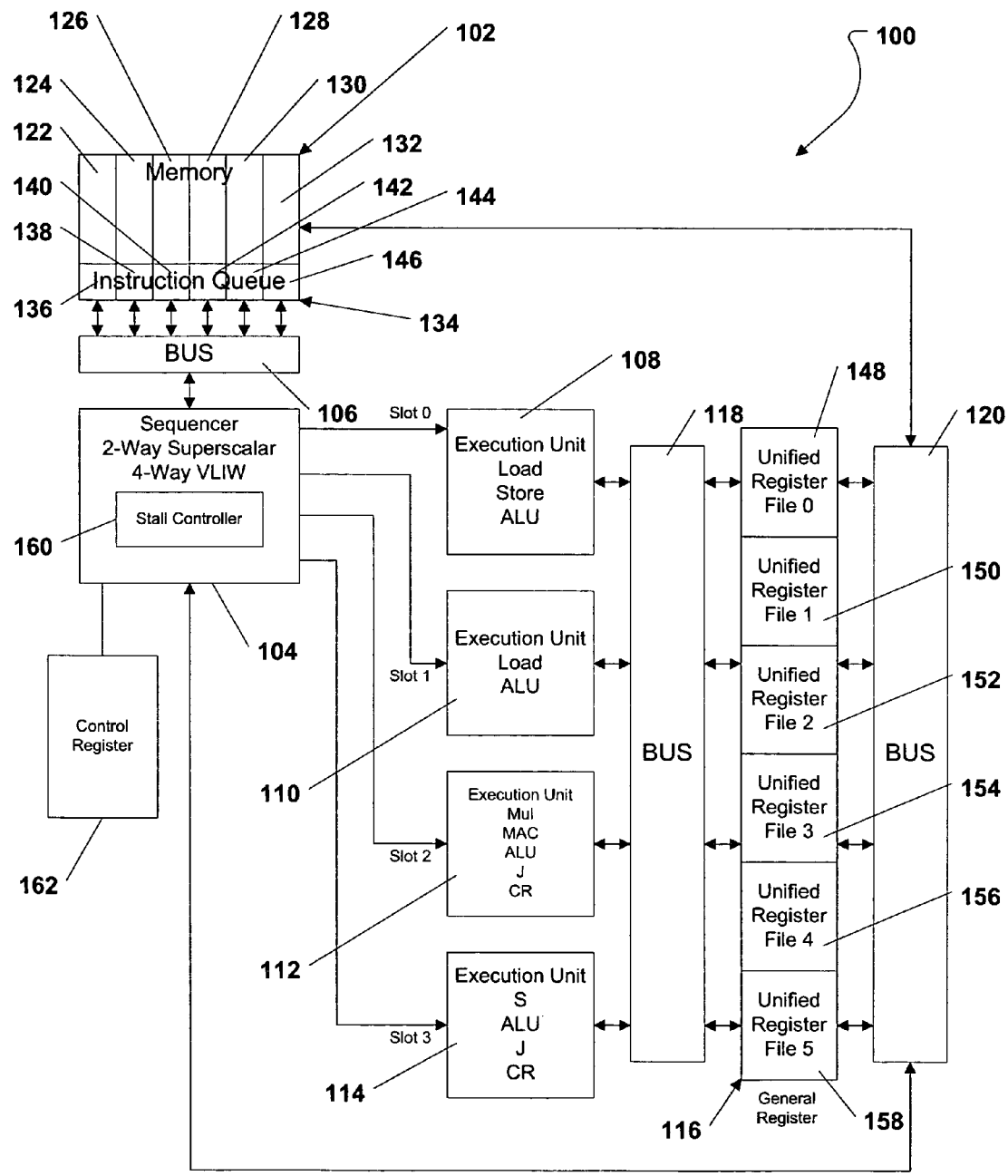
FIG. 1 is a general diagram of an exemplary digital signal processor.

FIG. 1 illustrates a block diagram of an exemplary, non-limiting embodiment of a digital signal processor (DSP) 100. As illustrated in FIG. 1, the DSP 100 includes a memory 102 that is coupled to a sequencer 104 via a bus 106. In a particular embodiment, the bus 106 is a sixty-four (64) bit bus and the sequencer 104 is configured to retrieve instructions from the memory 102 having a length of thirty-two (32) bits. The bus 106 is coupled to a first instruction execution unit 108, a second instruction execution unit 110, a third instruction execution unit 112, and a fourth instruction execution unit 114. FIG. 1 indicates that each instruction execution unit 108, 110, 112, 114 can be coupled to a general register file 116 via a first bus 118. The general register file 116 can also be coupled to the sequencer 104 and the memory 102 via a second bus 120.

In a particular embodiment, the memory 102 is a content addressable memory (CAM) that includes a first instruction cache 122, a second instruction cache 124, a third instruction cache 126, a fourth instruction cache 128, a fifth instruction cache 130, and a sixth instruction cache 132. During operation, the instruction caches 122, 124, 126, 128, 130, 132 can be accessed independently of each other by the sequencer 104. Additionally, in a particular embodiment, each instruction cache 122, 124, 126, 128, 130, 132 includes a plurality of instructions, instruction steering data for each instruction, and instruction pre-decode data for each instruction.

As illustrated in FIG. 1, the memory 102 can include an instruction queue 134 that includes an instruction queue for each instruction cache 122, 124, 126, 128, 130, 132. In particular, the instruction queue 134 includes a first instruction queue 136 that is associated with the first instruction cache 122, a second instruction queue 138 that is associated with the second instruction cache 124, a third instruction queue 140 that is associated with the third instruction cache 126, a fourth instruction queue 142 that is associated with the fourth instruction cache 128, a fifth instruction queue 144 that is associated with the fifth instruction cache 130, and a sixth instruction queue 146 that is associated with the sixth instruction cache 132.

During operation, the sequencer 104 can fetch instructions from each instruction cache 122, 124, 126, 128, 130, 132 via the instruction queue 134. In a particular embodiment, the sequencer 104 fetches instructions from the instruction queues 136, 138, 140, 142, 144, 146 in order from the first instruction queue 136 to the sixth instruction queue 146. After fetching an instruction from the sixth instruction queue 146, the sequencer 104 returns to the first instruction queue 136 and continues fetching instructions from the instruction queues 136, 138, 140, 142, 144, 146 in order.

In a particular embodiment, the sequencer 104 operates in a first mode as a 2-way superscalar sequencer that supports superscalar instructions. Further, in a particular embodiment, the sequencer also operates in a second mode that supports very long instruction words (VLIWs). In particular, the sequencer can operate as a 4-way VLIW sequencer. In a particular embodiment, the first instruction execution unit 108 can execute a load instruction, a store instruction, and an arithmetic logic unit (ALU) instruction. The second instruction execution unit 110 can execute a load instruction and an ALU instruction. Also, the third instruction execution unit can execute a multiply instruction, a multiply-accumulate instruction (MAC), an ALU instruction, a program redirect construct, and a transfer register (CR) instruction. FIG. 1 further indicates that the fourth instruction execution unit 114 can execute a shift (S) instruction, an ALU instruction, a program redirect construct, and a CR instruction. In a particular embodiment, the program redirect construct can be a zero overhead loop, a branch instruction, a jump (J) instruction, etc.

As depicted in FIG. 1, the general register 116 includes a first unified register file 148, a second unified register file 150, a third unified register file 152, a fourth unified register file 154, a fifth unified register file 156, and a sixth unified register file 158. Each unified register file 148, 150, 152, 154, 156, 158 corresponds to an instruction cache 122, 124, 126, 128, 130, 132 within the memory 102. Further, in a particular embodiment, each unified register file 148, 150, 152, 154, 156, 158 has the same construction and includes an equal number of data operands and address operands. In a particular embodiment, as illustrated in FIG. 1, the sequencer 104 includes a stall controller 160. Further, the sequencer 104 is coupled to a control register 162.

During operation of the digital signal processor 100, instructions are fetched from the memory 102 by the sequencer 104, sent to designated instruction execution units 108, 110, 112, 114, and executed at the instruction execution units 108, 110, 112, 114. The results at each instruction execution unit 108, 110, 112, 114 can be written to the general register 116, i.e., to one of the unified register files 148, 150, 152, 154, 156, 158.

In a particular embodiment, two or more program threads can be linked together to be executed in a lock-step manner, as indicated by the control register 162. As such, if one of the program threads stalls, i.e., experiences a stall event such as a cache miss, the threads linked to the stalled program thread can be instructed by the stall controller 160 to perform one or more no operation instructions until the stall event is cleared. Alternatively, the threads linked to the stalled program thread can be instructed to perform a stall until the stall event is cleared. This method of executing two or more program threads in lock-step is described in detail below in conjunction with the description of FIG. 6.

Figure 2:
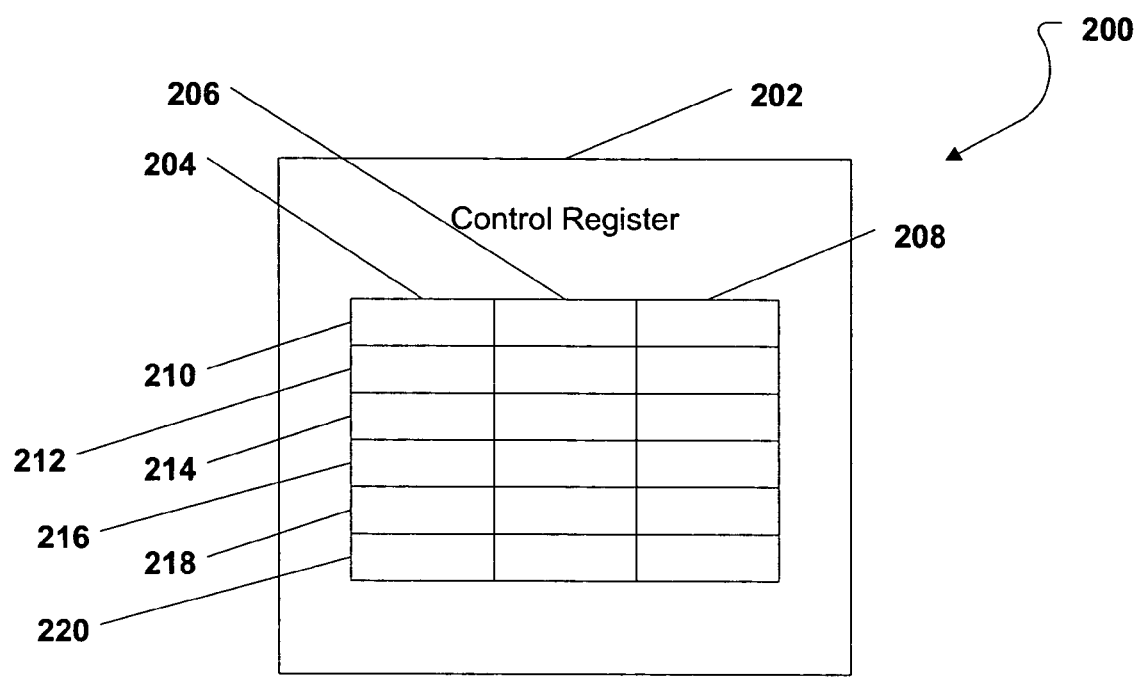
FIG. 2 is a general diagram of an exemplary control register file of the digital signal processor shown in FIG. 1.

Referring to FIG. 2, an exemplary, non-limiting embodiment of a control register is shown and is generally designated 200. As shown, the control register 200 includes a first thread execution linking register 204, a second thread execution linking register 206, and a third thread execution linking register 208. Each thread execution linking register 204, 206, 208 includes a first field 210, a second field 212, a third field 214, a fourth field 216, a fifth field 218, and a sixth field 220.

In a particular embodiment, the first field 210 of each thread execution linking register 204, 206, 208 is associated with a first program thread. The second field 212 of each thread execution linking register 204, 206, 208 is associated with a second program thread. Further, the third field 214 of each thread execution linking register 204, 206, 208 is associated with a third program thread. The fourth field 216 of each thread execution linking register 204, 206, 208 is associated with a fourth program thread. The fifth field 218 of each thread execution linking register 204, 206, 208 is associated with a fifth program thread. Additionally, the sixth field 220 of each thread execution linking register 204, 206, 208 is associated with a sixth program thread.

In a particular embodiment, two or more program threads can be linked together so that they will be executed together, as described below, by inputting a value, e.g., a one (1), to the associated field in the thread execution linking register 204, 206, 208. For example, when the first execution linking register 204 within the control register includes a one (1) in the second field 212 and a one (1) in the sixth field 220, the second program thread will be executed in lock step with the sixth program thread. Further, in a particular embodiment, a second execution link can be programmed by inputting a one (1) within one or more fields within the second execution linking register 206. Additionally, a third execution link can be programmed by inputting a one (1) within one or more fields within the third execution linking register 208.

Figure 3:
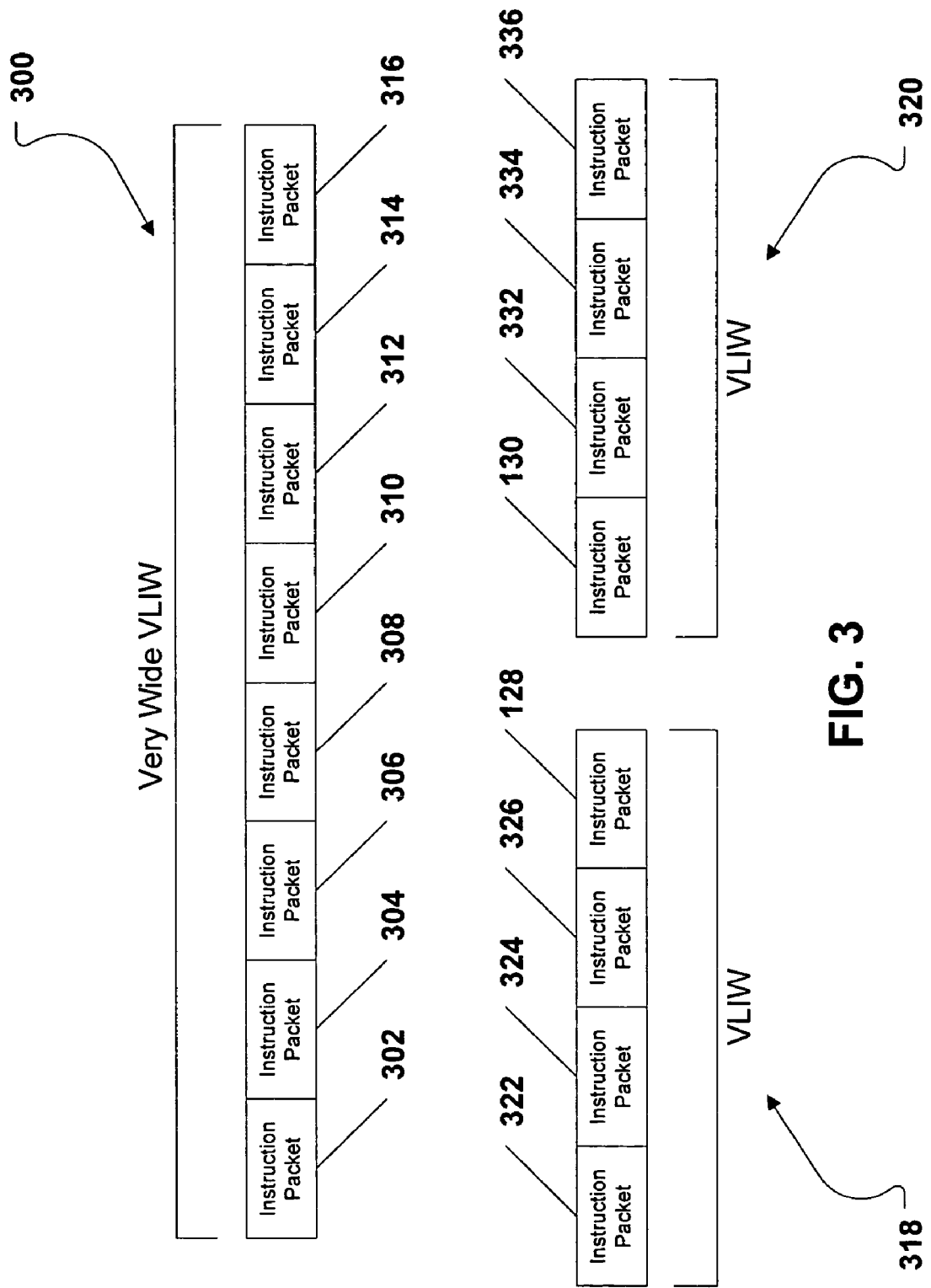
FIG. 3 is a diagram of an exemplary very wide very long instruction word instruction.

FIG. 3 shows a virtual very wide very long instruction word (VLIW), designated 300. As illustrated in FIG. 3, the virtual very wide VLIW includes a first instruction 302, a second instruction 304, a third instruction 306, a fourth instruction 308, a fifth instruction 310, a sixth instruction 312, a seventh instruction 314, and an eighth instruction 316.

In a particular embodiment, the very wide VLIW 300 can be "split" into a first portion 318 that can be executed as a first program thread and a second portion 320 that can be executed as a second program thread. As shown in FIG. 3, the first portion 318 of the very wide VLIW 300 includes a first instruction 322, a second instruction 324, a third instruction 326, and a fourth instruction 328. Additionally, the second portion 320 of the very VLIW 300 includes a first instruction 330, a second instruction 332, a third instruction 334, and a fourth instruction 336. During operation, the first program thread established by the first portion 318 of the very wide VLIW 300 can be executed in a lock step manner with the second program thread established by the second portion 320 of the very wide VLIW 300 to establish a "virtual" very wide VLIW.

In a particular embodiment, a programmer can program complex programs using multiple very wide VLIWs 300. Thereafter, an assembler can split the very wide VLIWs 300 to create a first program thread and a second program that can be executed in the lock-step manner described herein.

Figure 4:
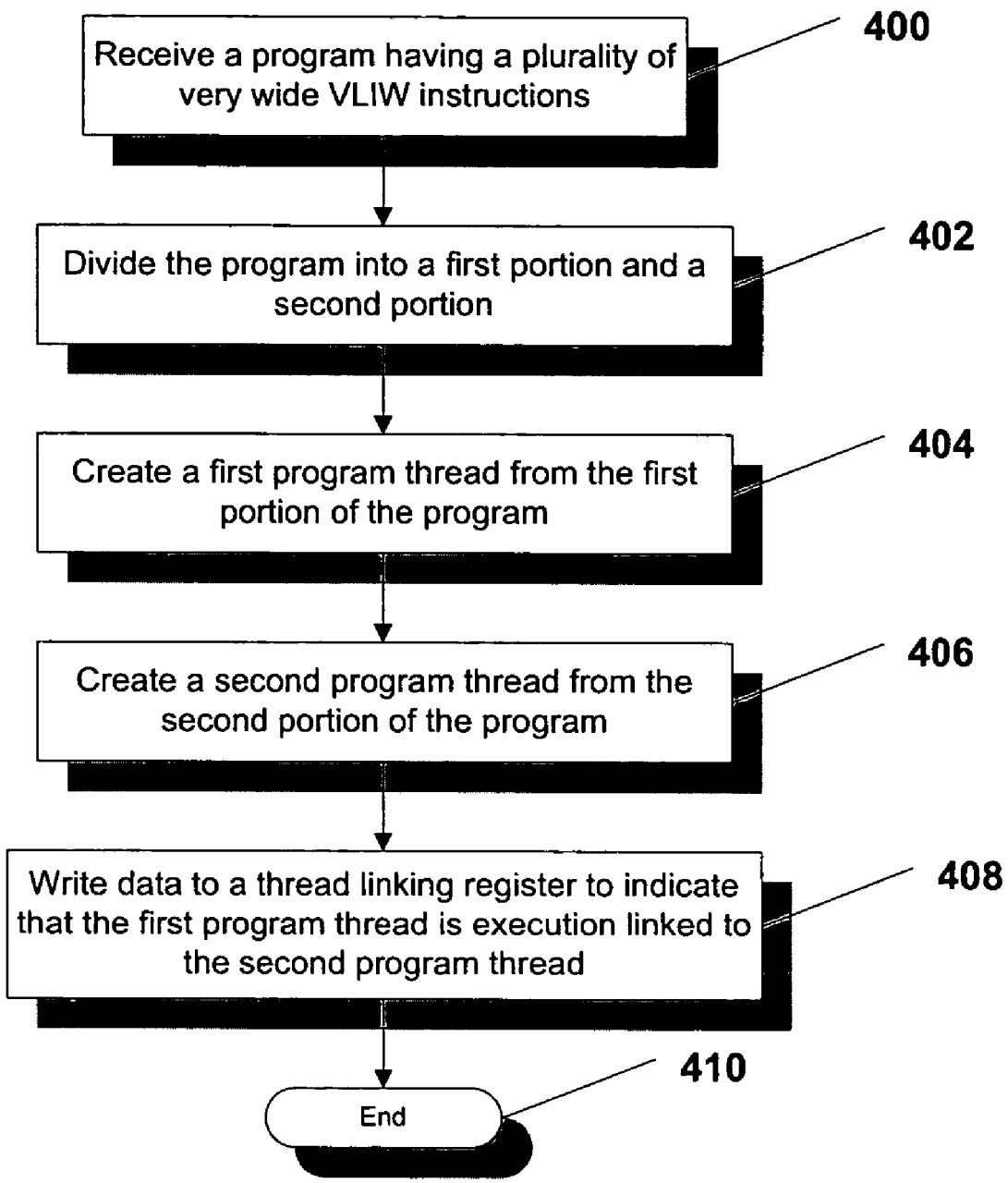
FIG. 4 is a flow chart illustrating a method of splitting the very wide very long instruction word instruction of FIG. 3.

Referring to FIG. 4, a method of dividing a program is shown and commences at block 400. At block 400, an assembler receives a program that has a plurality of very wide VLIWs. In a particular embodiment, each very wide VLIW includes eight (8) instructions. Moving to block 402, the assembler divides the program into a first portion and a second portion. At block 404, the assembler creates a first program thread from the first portion of the program and at block 406, the assembler creates a second program thread from the second portion of the program.

In an exemplary, non-limiting embodiment, the first program thread includes a plurality of VLIWs and each VLIW includes four (4) instructions. Further, in an exemplary, non-limiting embodiment, the second program thread includes a plurality of VLIWs and each VLIW includes four (4) instructions. Continuing to block 408, the assembler writes data to a thread linking register to indicate that the first program thread is execution linked to the second program thread. In an illustrative embodiment, the assembler can write a one to the control register to indicate that programs are linked and are to be executed in a lock-step multithreaded manner. The method ends at state 410.

Figure 5:
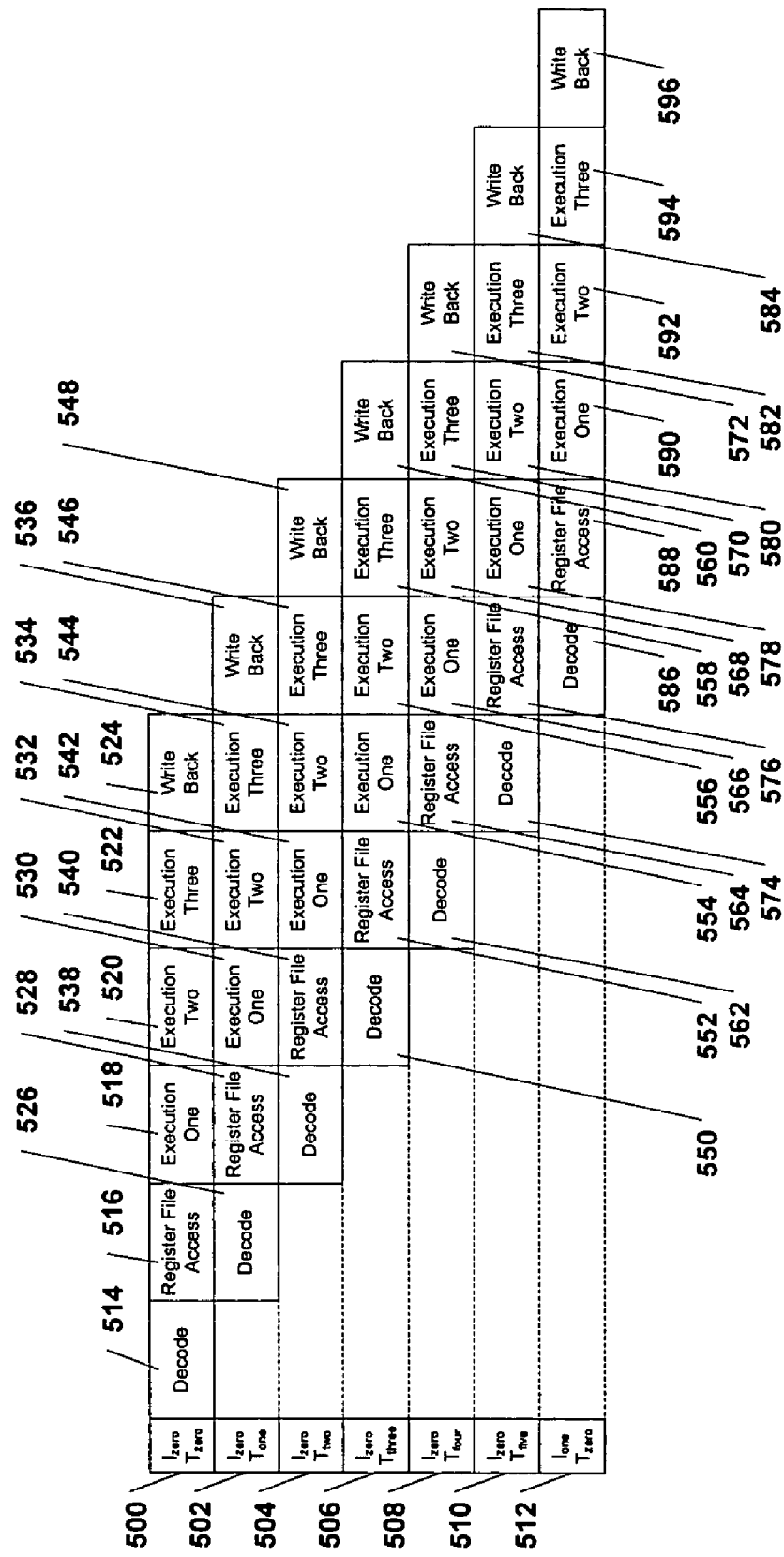
FIG. 5 is a diagram illustrating a multithreading operation of the digital signal processor shown in FIG. 1.

Referring to FIG. 5, a general method of multithreaded operation for a digital signal processor is shown. FIG. 5 shows the method as it is performed for the first instruction of six independent program threads and the second instruction of the first program thread. In particular, FIG. 5 depicts a first instruction of a first program thread 500, a first instruction of a second program thread 502, a first instruction of a third program thread 504, a first instruction of a fourth program thread 506, a first instruction of a fifth program thread 508, a first instruction of a sixth program thread 510, and a second instruction of the first program thread 512.

As depicted in FIG. 5, the first instruction of the first program thread 500 includes a decode step 514, a register file access step 516, a first execution step 518, a second execution step 520, a third execution step 522, and a writeback step 524 for the first instruction of the first program thread 500. The first instruction of the second program thread 502 includes a decode step 526, a register file access step 528, a first execution step 530, a second execution step 532, a third execution step 534, and a writeback step 536. Further, the first instruction of the third program thread 504 includes a decode step 538, a register file access step 540, a first execution step 542, a second execution step 544, a third execution step 546, and a writeback step 548.

In a particular embodiment, the first instruction of the fourth program thread 506 also includes a decode step 550, a register file access step 552, a first execution step 554, a second execution step 556, a third execution step 558, and a writeback step 560. Additionally, as shown in FIG. 5, the first instruction of the fifth program thread 508 includes a decode step 562, a register file access step 564, a first execution step 566, a second execution step 568, a third execution step 570, and a writeback step 572. Moreover, the first instruction of the sixth program thread 510 includes a decode step 574, a register file access step 576, a first execution step 578, a second execution step 580, a third execution step 582, and a writeback step 584. Finally, as depicted in FIG. 5, the second instruction of the first thread 512 includes a decode step 586, a register file access step 588, a first execution step 590, a second execution step 592, a third execution step 594, and a writeback step 596.

In a particular embodiment, as indicated in FIG. 5, the decode step 526 of the first instruction of the second program thread 502 is performed concurrently with the register file access step 516 of the first instruction of the first program thread 500. The decode step 538 of the first instruction of the third program thread 504 is performed concurrently with the register file access step 528 of the first instruction of the second program thread 502 and the first execution step 518 of the first instruction of the first program thread 500. Further, the decode step 550 of the first instruction of the fourth program thread 506 is performed concurrently with the register file access step 540 of the first instruction of the third program thread 504, the first execution step 530 of the first instruction of the second program thread 502, and the second execution step 520 of the first instruction of the first program thread 500.

FIG. 5 further shows that the decode step 562 of the first instruction of the fifth program thread 508 is performed concurrently with the register file access step 552 of the first instruction of the fourth program thread 506, the first execution step 542 of the first instruction of the third program thread 504, the second execution step 532 of the first instruction of the second program thread 502, and the third execution step 522 of the first instruction of the first program thread 500. Additionally, the decode step 574 of the first instruction of the sixth program thread 510 is performed concurrently with the register file access step 564 of the first instruction of the fifth program thread 508, the first execution step 554 of the first instruction of the fourth program thread 506, the second execution step 544 of the first instruction of the third program thread 504, the third execution step 534 of the first instruction of the second program thread 502, and the writeback step 524 of the first instruction of the first program thread 500.

As indicated in FIG. 5, the decode step 586 of the first thread of the second instruction 512 is performed concurrently with the register file access step 576 of the sixth thread of the first instruction 510, the first execution step 566 of the first instruction of the fifth program thread 508, the second execution step 556 of the first instruction of the fourth program thread 506, the third execution step 546 of the first instruction of the third program thread 504, and the writeback step 536 of the first instruction of the second program thread 502.

In a particular embodiment, the decode step, the register file access, step, the first execution step, the second execution step, the third execution step, and the write back step for each of the instructions of the program threads establish instruction pipelines for the program threads. Each pipeline utilizes a number of clock cycles, e.g., six clock cycles, that is less than an instruction issue rate, seven clock cycles, for each program thread stored within the memory unit. For example, a new instruction for the first program thread can issue after an instruction is issued for sixth program thread. In a particular embodiment, six clock cycles comprise a super cycle. Further, in an illustrative embodiment, two or more program threads can be execution linked in a lock-step manner so that a second instruction may be executed in the same super cycle as a first instruction to which it is linked.

Figure 6:
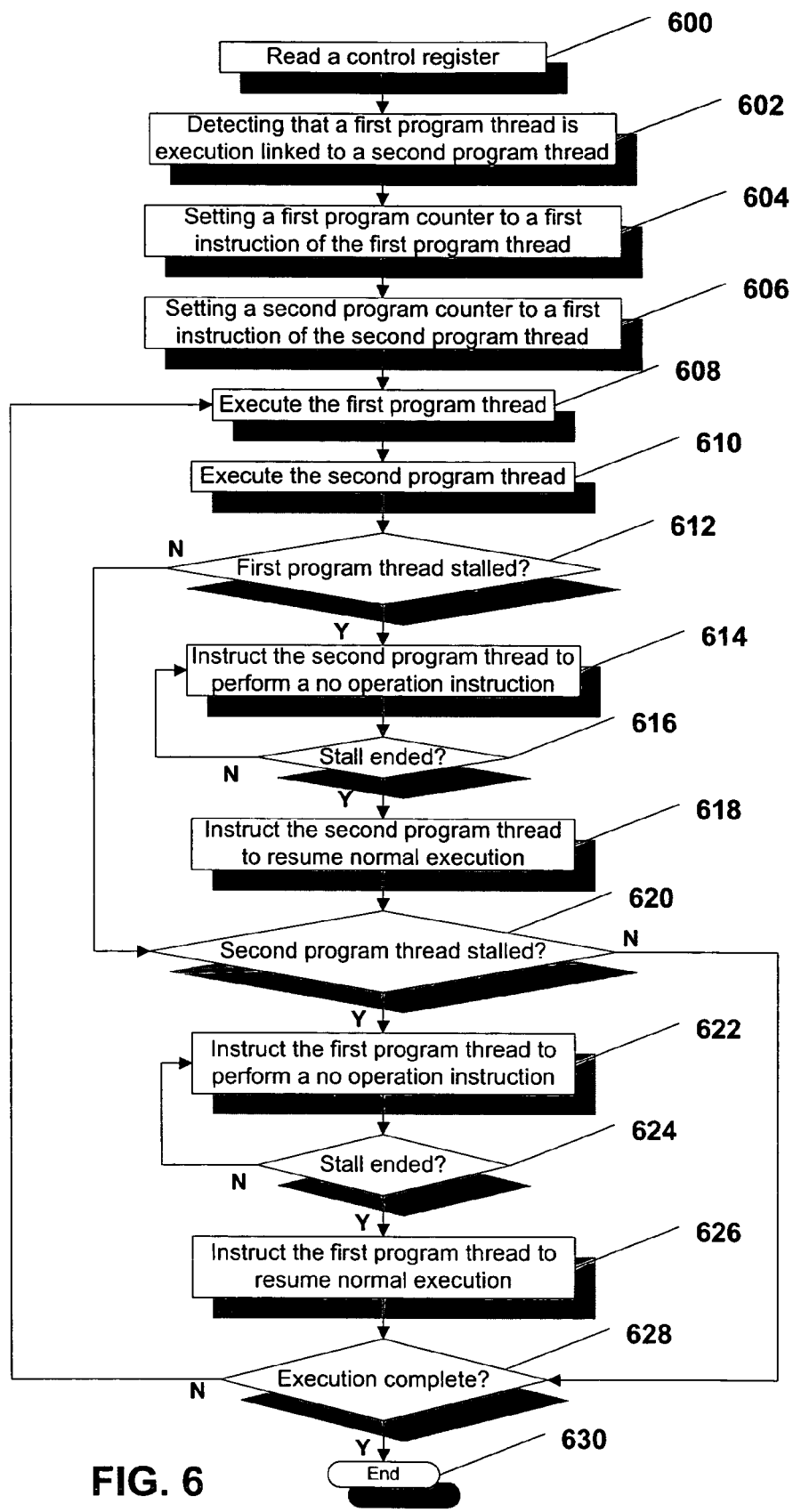
FIG. 6 is a flow chart illustrating a method of executing a first program thread in lock step with a second program thread.

FIG. 6 shows a method of executing two threads in a lock step manner within a digital signal processor. Beginning at block 600, a sequencer reads a control register. At block 602, the sequencer detects that a first program thread is execution linked to a second program thread. Moving to block 604, the sequencer sets a first program counter to the first instruction of the first program thread and at block 606 the sequencer sets a second program counter to the first instruction of the second program thread.

Proceeding to block 608, the sequencer executes the first program thread. In other words, the sequencer issues the first instruction of the first program thread to an execution unit to be executed. At block 610, the digital signal processor executes the second program thread. In other words, the sequencer issues the first instruction of the second program thread to an execution unit to be executed. In a particular embodiment, the instruction of both the first and second program thread are executed in a common super cycle that can include six clock cycles. Moving to decision step 612, a stall controller within the sequencer determines whether the first program thread is stalled, e.g., whether an instruction execution unit has failed to execute an instruction of the first program thread. The first program thread can stall to a stall event such as a cache miss. At decision step 612, if the first program thread is stalled, the method continues to block 614 and the stall controller instructs the second program thread to perform a no operation instruction. Alternatively, the stall controller can assert a stall on the second program thread, i.e., the stall controller can instruct or otherwise cause the second program thread to stall. In a particular embodiment, when the second program thread performs a no operation instruction or a forced stall, the second program thread remains in lock step with the first program thread after the first program thread experiences a stall event or stall condition.

Continuing to decision step 616, the stall controller determines whether the stall has ended, i.e., whether the stall event or the stall condition has been cleared. In a particular embodiment, when the stalled instruction is executed, the stall can be considered ended. If the stall has not ended, the method returns to block 614 and the stall controller instructs the second program thread to perform another no operation instruction. Alternatively, the stall controller causes the second program thread to stall. At decision step 616, when the stall ends, the stall controller instructs the second program thread to resume normal execution. The method then continues to decision step 620. Returning to decision step 612, if the first program thread is not stalled, the method also continues from decision step 612 to decision step 620.

At decision step 620, the stall controller detects whether the second program thread has stalled. When the second program thread stalls, the method proceeds to block 622 and the stall controller instructs the first program thread to perform a no operation instruction. In an alternative embodiment, the stall controller asserts a stall on the first program thread. Then, at decision step 624, the stall controller determines whether the stall of the second program thread has ended. If the stall has not ended, the method returns to block 622 and the stall controller instructs the first program thread to perform another no operation instruction. Alternatively, the stall controller causes the first program thread to stall. When the stall ends, the stall controller instructs the first program thread to resume normal execution. The method then proceeds to decision step 628. Returning to decision step 620, if the second program has not stalled the method jumps from decision step 620 to decision step 628.

At decision step 628, the sequencer determines whether the execution of the program threads is complete. If so, the method ends at state 630. On the other hand, the method returns to block 608 and the sequencer continues to execute the instructions of the first program thread and the second program thread in an execution linked manner. In other words, the sequencer issues the next instruction of the first program thread to an execution unit to be executed. Thereafter, at block 610, the sequencer continues to execute the instructions of the second program thread.

Figure 7:
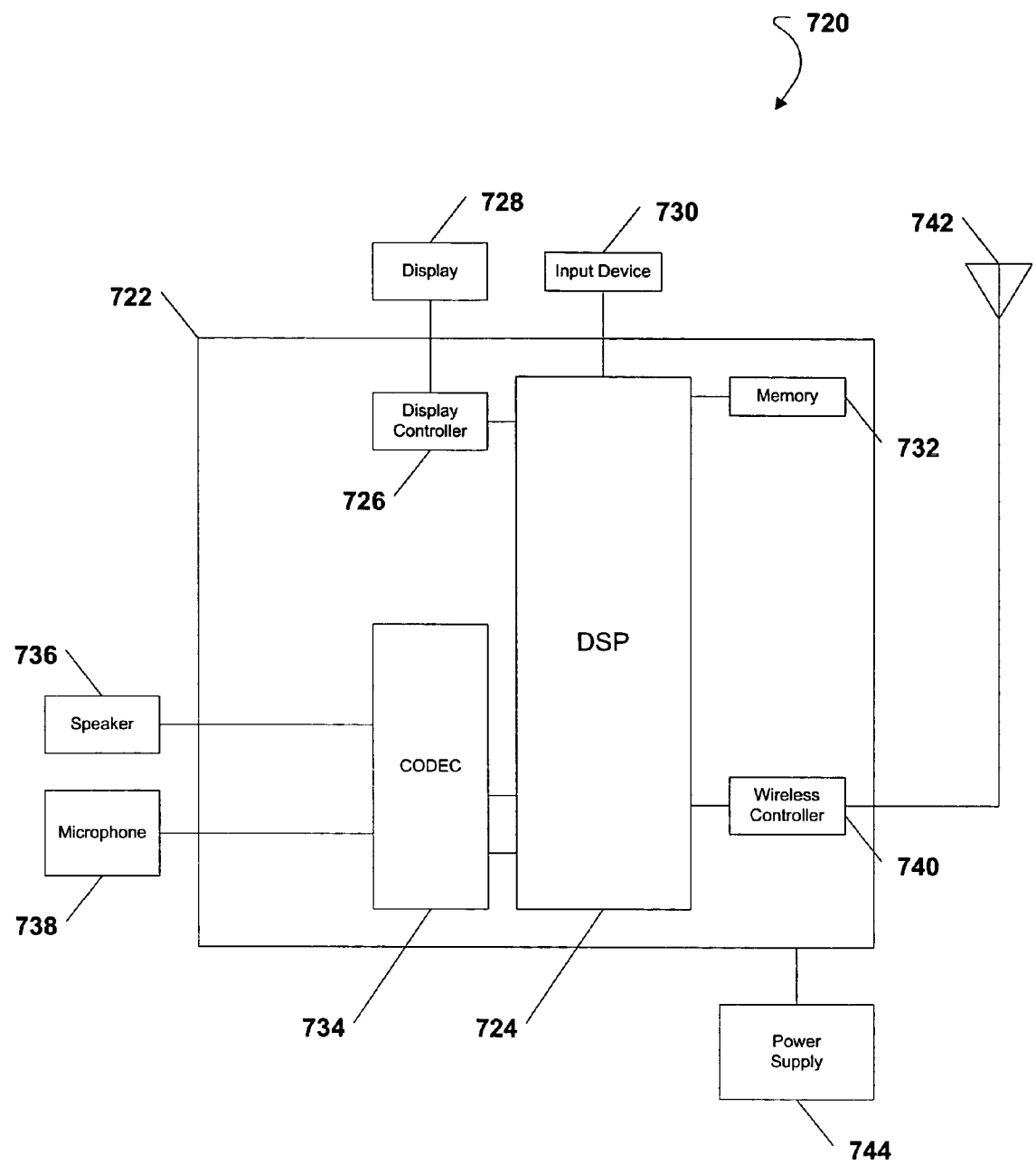
FIG. 7 is a general diagram of a portable communication device incorporating a digital signal processor.

FIG. 7 illustrates an exemplary, non-limiting embodiment of a portable communication device that is generally designated 720. As illustrated in FIG. 7, the portable communication device includes an on-chip system 722 that includes a digital signal processor 724. In a particular embodiment, the digital signal processor 724 is the digital signal processor shown in FIG. 1 and described herein. FIG. 7 also shows a display controller 726 that is coupled to the digital signal processor 724 and a display 728. Moreover, an input device 730 is coupled to the digital signal processor 724. As shown, a memory 732 is coupled to the digital signal processor 724. Additionally, a coder/decoder (CODEC) 734 can be coupled to the digital signal processor 724. A speaker 736 and a microphone 738 can be coupled to the CODEC 730.

FIG. 7 also indicates that a wireless controller 740 can be coupled to the digital signal processor 724 and a wireless antenna 742. In a particular embodiment, a power supply 744 is coupled to the on-chip system 702. Moreover, in a particular embodiment, as illustrated in FIG. 7, the display 726, the input device 730, the speaker 736, the microphone 738, the wireless antenna 742, and the power supply 744 are external to the on-chip system 722. However, each is coupled to a component of the on-chip system 722.

In a particular embodiment, the digital signal processor 724 utilizes interleaved multithreading to process instructions associated with program threads necessary to perform the functionality and operations needed by the various components of the portable communication device 720. For example, when a wireless communication session is established via the wireless antenna a user can speak into the microphone 738. Electronic signals representing the user's voice can be sent to the CODEC 734 to be encoded. The digital signal processor 724 can perform data processing for the CODEC 734 to encode the electronic signals from the microphone. Further, incoming signals received via the wireless antenna 742 can be sent to the CODEC 734 by the wireless controller 740 to be decoded and sent to the speaker 736. The digital signal processor 724 can also perform the data processing for the CODEC 734 when decoding the signal received via the wireless antenna 742.

Further, before, during, or after the wireless communication session, the digital signal processor 724 can process inputs that are received from the input device 730. For example, during the wireless communication session, a user may be using the input device 730 and the display 728 to surf the Internet via a web browser that is embedded within the memory 732 of the portable communication device 720. The digital signal processor 724 can interleave various program threads that are used by the input device 730, the display controller 726, the display 728, the CODEC 734 and the wireless controller 740, as described herein, to efficiently control the operation of the portable communication device 720 and the various components therein. Many of the instructions associated with the various program threads are executed concurrently during one or more clock cycles. As such, the power and energy consumption due to wasted clock cycles may be substantially decreased.

Figure 8:
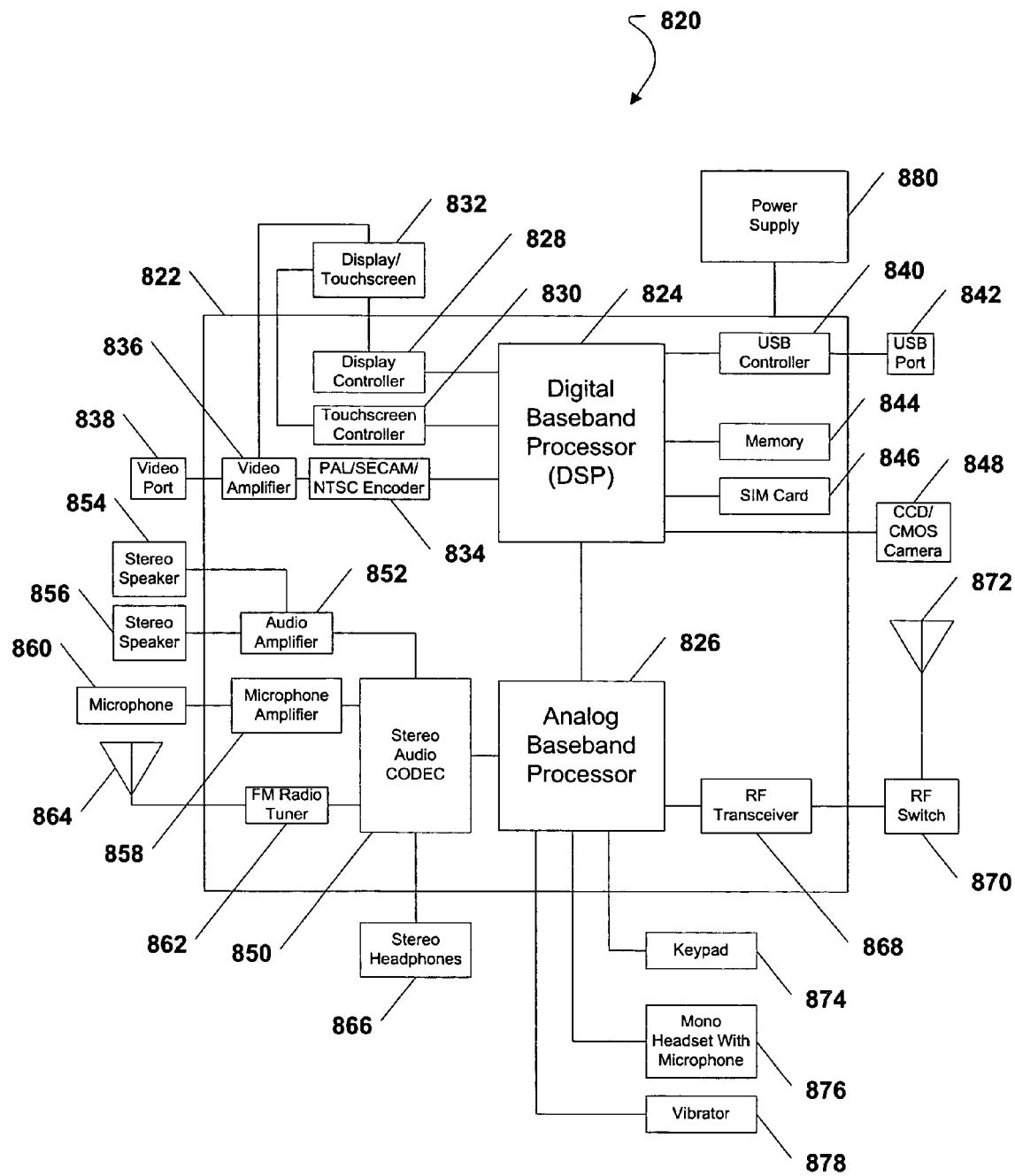
FIG. 8 is a general diagram of an exemplary cellular telephone incorporating a digital signal processor.

Referring to FIG. 8, an exemplary, non-limiting embodiment of a cellular telephone is shown and is generally designated 820. As shown, the cellular telephone 820 includes an on-chip system 822 that includes a digital baseband processor 824 and an analog baseband processor 826 that are coupled together. In a particular embodiment, the digital baseband processor 824 is a digital signal processor, e.g., the digital signal processor shown in FIG. 1 and described herein. As illustrated in FIG. 8, a display controller 828 and a touchscreen controller 830 are coupled to the digital baseband processor 824. In turn, a touchscreen display 832 external to the on-chip system 822 is coupled to the display controller 828 and the touchscreen controller 830.

FIG. 8 further indicates that a video encoder 834, e.g., a phase alternating line (PAL) encoder, a sequential couleur a memoire (SECAM) encoder, or a national television system (s) committee (NTSC) encoder, is coupled to the digital baseband processor 824. Further, a video amplifier 836 is coupled to the video encoder 834 and the touchscreen display 832. Also, a video port 838 is coupled to the video amplifier 836. As depicted in FIG. 8, a universal serial bus (USB) controller 840 is coupled to the digital baseband processor 824. Also, a USB port 842 is coupled to the USB controller 840. A memory 844 and a subscriber identity module (SIM) card 846 can also be coupled to the digital baseband processor 824. Further, as shown in FIG. 8, a digital camera 848 can be coupled to the digital baseband processor 824. In an exemplary embodiment, the digital camera 848 is a charge-coupled device (CCD) camera or a complementary metal-oxide semiconductor (CMOS) camera.

As further illustrated in FIG. 8, a stereo audio CODEC 850 can be coupled to the analog baseband processor 826. Moreover, an audio amplifier 852 can coupled to the to the stereo audio CODEC 850. In an exemplary embodiment, a first stereo speaker 854 and a second stereo speaker 856 are coupled to the audio amplifier 852. FIG. 8 shows that a microphone amplifier 858 can be also coupled to the stereo audio CODEC 850. Additionally, a microphone 860 can be coupled to the microphone amplifier 858. In a particular embodiment, a frequency modulation (FM) radio tuner 862 can be coupled to the stereo audio CODEC 850. Also, an FM antenna 864 is coupled to the FM radio tuner 862. Further, stereo headphones 866 can be coupled to the stereo audio CODEC 850.

FIG. 8 further indicates that a radio frequency (RF) transceiver 868 can be coupled to the analog baseband processor 826. An RF switch 870 can be coupled to the RF transceiver 868 and an RF antenna 872. As shown in FIG. 8, a keypad 874 can be coupled to the analog baseband processor 826. Also, a mono headset with a microphone 876 can be coupled to the analog baseband processor 826. Further, a vibrator device 878 can be coupled to the analog baseband processor 826. FIG. 8 also shows that a power supply 880 can be coupled to the on-chip system 822. In a particular embodiment, the power supply 880 is a direct current (DC) power supply that provides power to the various components of the cellular telephone 820 that require power. Further, in a particular embodiment, the power supply is a rechargeable DC battery or a DC power supply that is derived from an alternating current (AC) to DC transformer that is connected to an AC power source.

In a particular embodiment, as depicted in FIG. 8, the touchscreen display 832, the video port 838, the USB port 842, the camera 848, the first stereo speaker 854, the second stereo speaker 856, the microphone, the FM antenna 864, the stereo headphones 866, the RF switch 870, the RF antenna 872, the keypad 874, the mono headset 876, the vibrator 878, and the power supply 880 are external to the on-chip system 822. Moreover, in a particular embodiment, the digital baseband processor 824 can use interleaved multithreading, described herein, in order to process the various program threads associated with one or more of the different components associated with the cellular telephone 820.

Figure 9:
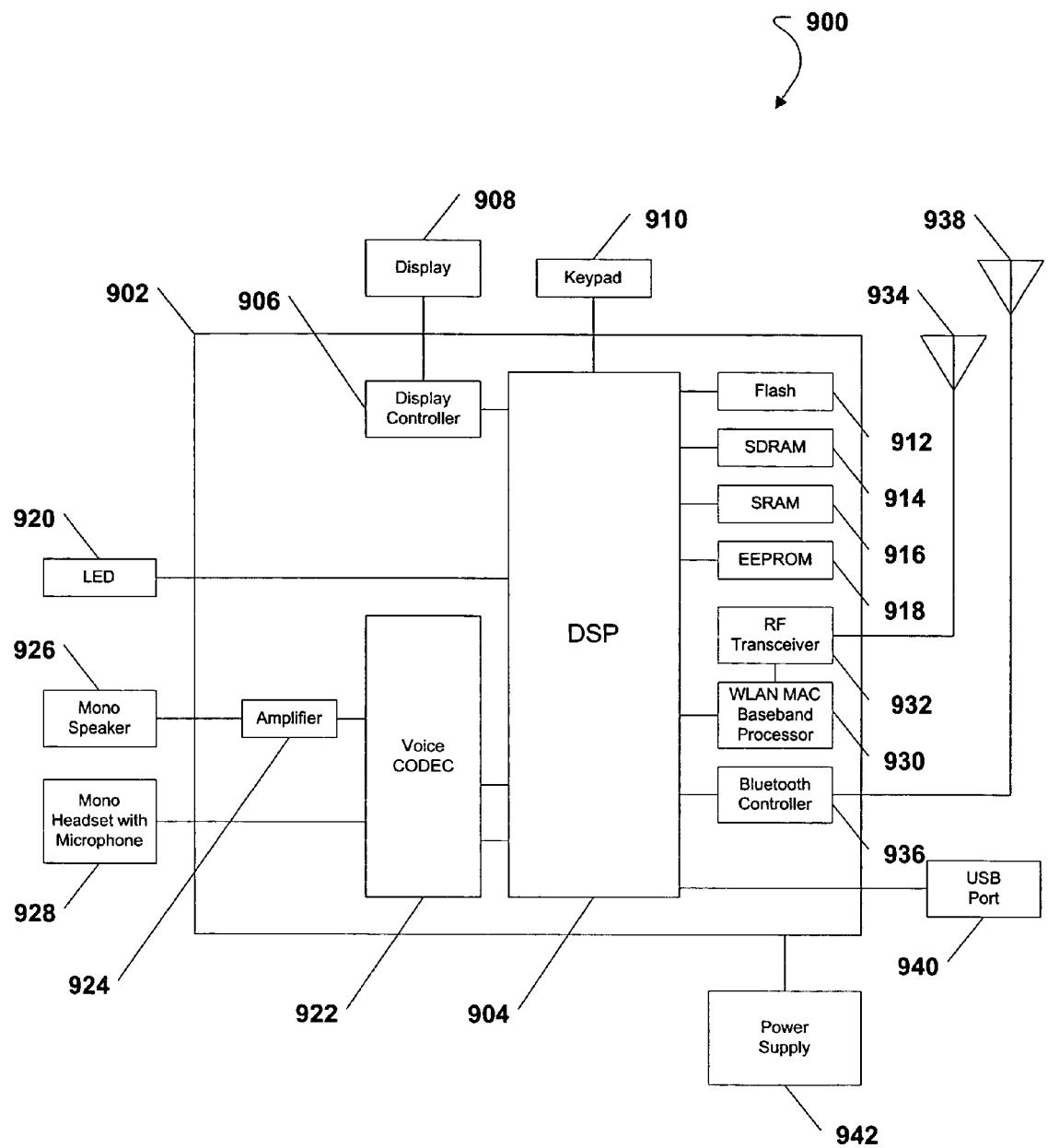
FIG. 9 is a general diagram of an exemplary wireless Internet Protocol telephone incorporating a digital signal processor.

Referring to FIG. 9, an exemplary, non-limiting embodiment of a wireless Internet protocol (IP) telephone is shown and is generally designated 900. As shown, the wireless IP telephone 900 includes an on-chip system 902 that includes a digital signal processor (DSP) 904. In a particular embodiment, the DSP 904 is the digital signal processor shown in FIG. 1 and described herein. As illustrated in FIG. 9, a display controller 906 is coupled to the DSP 904 and a display 908 is coupled to the display controller 906. In an exemplary embodiment, the display 908 is a liquid crystal display (LCD). FIG. 9 further shows that a keypad 910 can be coupled to the DSP 904.

As further depicted in FIG. 9, a flash memory 912 can be coupled to the DSP 904. A synchronous dynamic random access memory (SDRAM) 914, a static random access memory (SRAM) 916, and an electrically erasable programmable read only memory (EEPROM) 918 can also be coupled to the DSP 904. FIG. 9 also shows that a light emitting diode (LED) 920 can be coupled to the DSP 904. Additionally, in a particular embodiment, a voice CODEC 922 can be coupled to the DSP 904. An amplifier 924 can be coupled to the voice CODEC 922 and a mono speaker 926 can be coupled to the amplifier 924. FIG. 9 further indicates that a mono headset 928 can also be coupled to the voice CODEC 922. In a particular embodiment, the mono headset 928 includes a microphone.

FIG. 9 also illustrates that a wireless local area network (WLAN) baseband processor 930 can be coupled to the DSP 904. An RF transceiver 932 can be coupled to the WLAN baseband processor 930 and an RF antenna 934 can be coupled to the RF transceiver 932. In a particular embodiment, a Bluetooth controller 936 can also be coupled to the DSP 904 and a Bluetooth antenna 938 can be coupled to the controller 936. FIG. 9 also shows that a USB port 940 can also be coupled to the DSP 904. Moreover, a power supply 942 is coupled to the on-chip system 902 and provides power to the various components of the wireless IP telephone 900 via the on-chip system 902.

In a particular embodiment, as indicated in FIG. 9, the display 908, the keypad 910, the LED 920, the mono speaker 926, the mono headset 928, the RF antenna 934, the Bluetooth antenna 938, the USB port 940, and the power supply 942 are external to the on-chip system 902. However, each of these components is coupled to one or more components of the on-chip system. Further, in a particular embodiment, the digital signal processor 904 can use interleaved multithreading, as described herein, in order to process the various program threads, including execution linked threads associated with two or more of the different components associated with the IP telephone 900.

Figure 10:
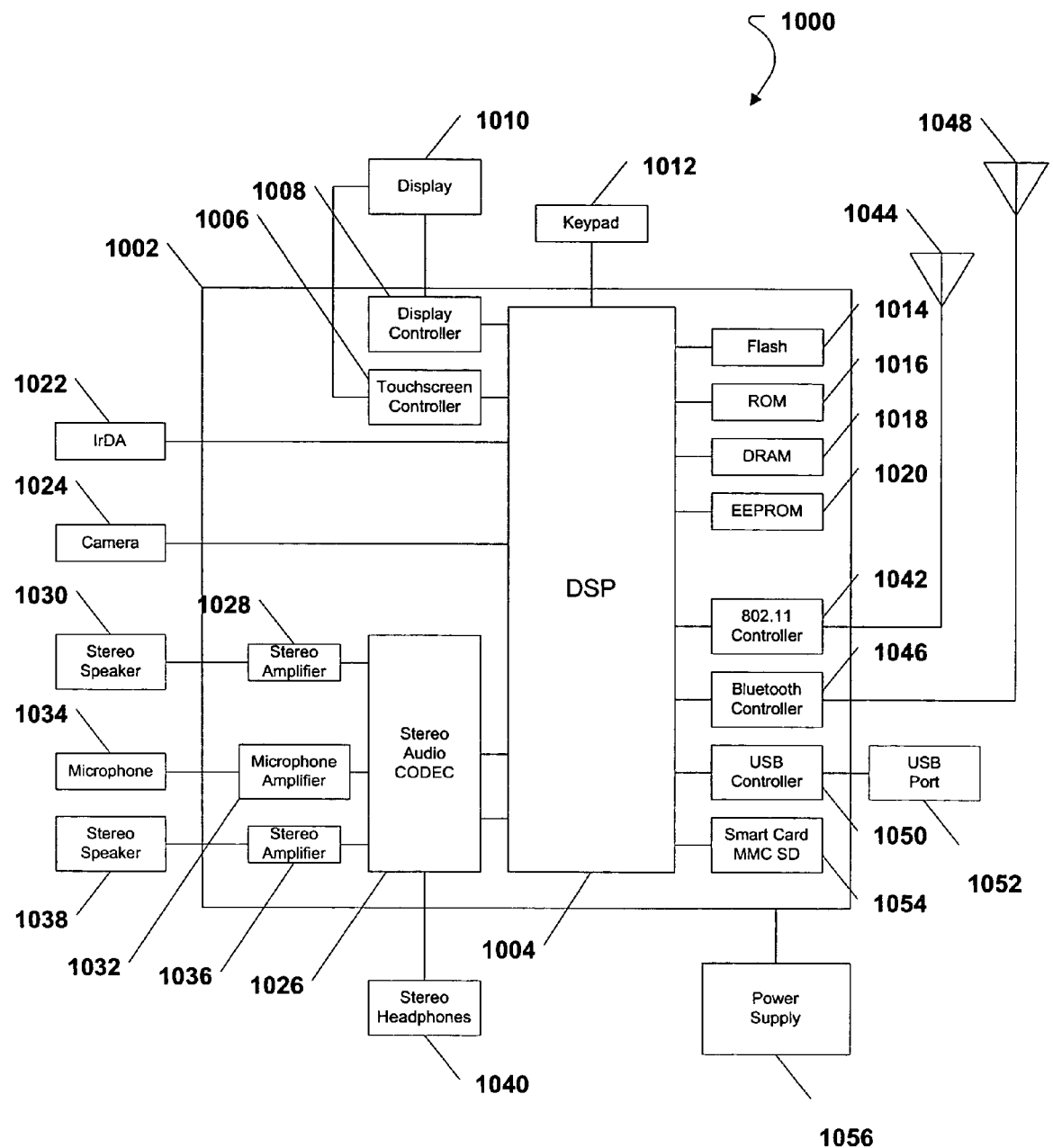
FIG. 10 is a general diagram of an exemplary portable digital assistant incorporating a digital signal processor.

FIG. 10 illustrates an exemplary, non-limiting embodiment of a portable digital assistant (PDA) that is generally designated 1000. As shown, the PDA 1000 includes an on-chip system 1002 that includes a digital signal processor (DSP) 1004. In a particular embodiment, the DSP 1004 is the digital signal processor shown in FIG. 1 and described herein. As depicted in FIG. 10, a touchscreen controller 1006 and a display controller 1008 are coupled to the DSP 1004. Further, a touchscreen display is coupled to the touchscreen controller 1006 and to the display controller 1008. FIG. 10 also indicates that a keypad 1012 can be coupled to the DSP 1004.

As further depicted in FIG. 10, a flash memory 1014 can be coupled to the DSP 1004. Also, a read only memory (ROM) 1016, a dynamic random access memory (DRAM) 1018, and an electrically erasable programmable read only memory (EEPROM) 1020 can be coupled to the DSP 1004. FIG. 10 also shows that an infrared data association (IrDA) port 1022 can be coupled to the DSP 1004. Additionally, in a particular embodiment, a digital camera 1024 can be coupled to the DSP 1004.

As shown in FIG. 10, in a particular embodiment, a stereo audio CODEC 1026 can be coupled to the DSP 1004. A first stereo amplifier 1028 can be coupled to the stereo audio CODEC 1026 and a first stereo speaker 1030 can be coupled to the first stereo amplifier 1028. Additionally, a microphone amplifier 1032 can be coupled to the stereo audio CODEC 1026 and a microphone 1034 can be coupled to the microphone amplifier 1032. FIG. 10 further shows that a second stereo amplifier 1036 can be coupled to the stereo audio CODEC 1026 and a second stereo speaker 1038 can be coupled to the second stereo amplifier 1036. In a particular embodiment, stereo headphones 1040 can also be coupled to the stereo audio CODEC 1026.

FIG. 10 also illustrates that an 802.11 controller 1042 can be coupled to the DSP 1004 and an 802.11 antenna 1044 can be coupled to the 802.11 controller 1042. Moreover, a Bluetooth controller 1046 can be coupled to the DSP 1004 and a Bluetooth antenna 1048 can be coupled to the Bluetooth controller 1046. As depicted in FIG. 10, a USB controller 1050 can be coupled to the DSP 1004 and a USB port 1052 can be coupled to the USB controller 1050. Additionally, a smart card 1054, e.g., a multimedia card (MMC) or a secure digital card (SD) can be coupled to the DSP 1004. Further, as shown in FIG. 10, a power supply 1056 can be coupled to the on-chip system 1002 and can provide power to the various components of the PDA 1000 via the on-chip system 1002.

In a particular embodiment, as indicated in FIG. 10, the display 1010, the keypad 1012, the IrDA port 1022, the digital camera 1024, the first stereo speaker 1030, the microphone 1034, the second stereo speaker 1038, the stereo headphones 1040, the 802.11 antenna 1044, the Bluetooth antenna 1048, the USB port 1052, and the power supply 1050 are external to the on-chip system 1002. However, each of these components is coupled to one or more components on the on-chip system. Additionally, in a particular embodiment, the digital signal processor 1004 can use interleaved multithreading, described herein, in order to process the various program threads, including execution linked threads associated with two or more of the different components associated with the portable digital assistant 1000.

Figure 11:
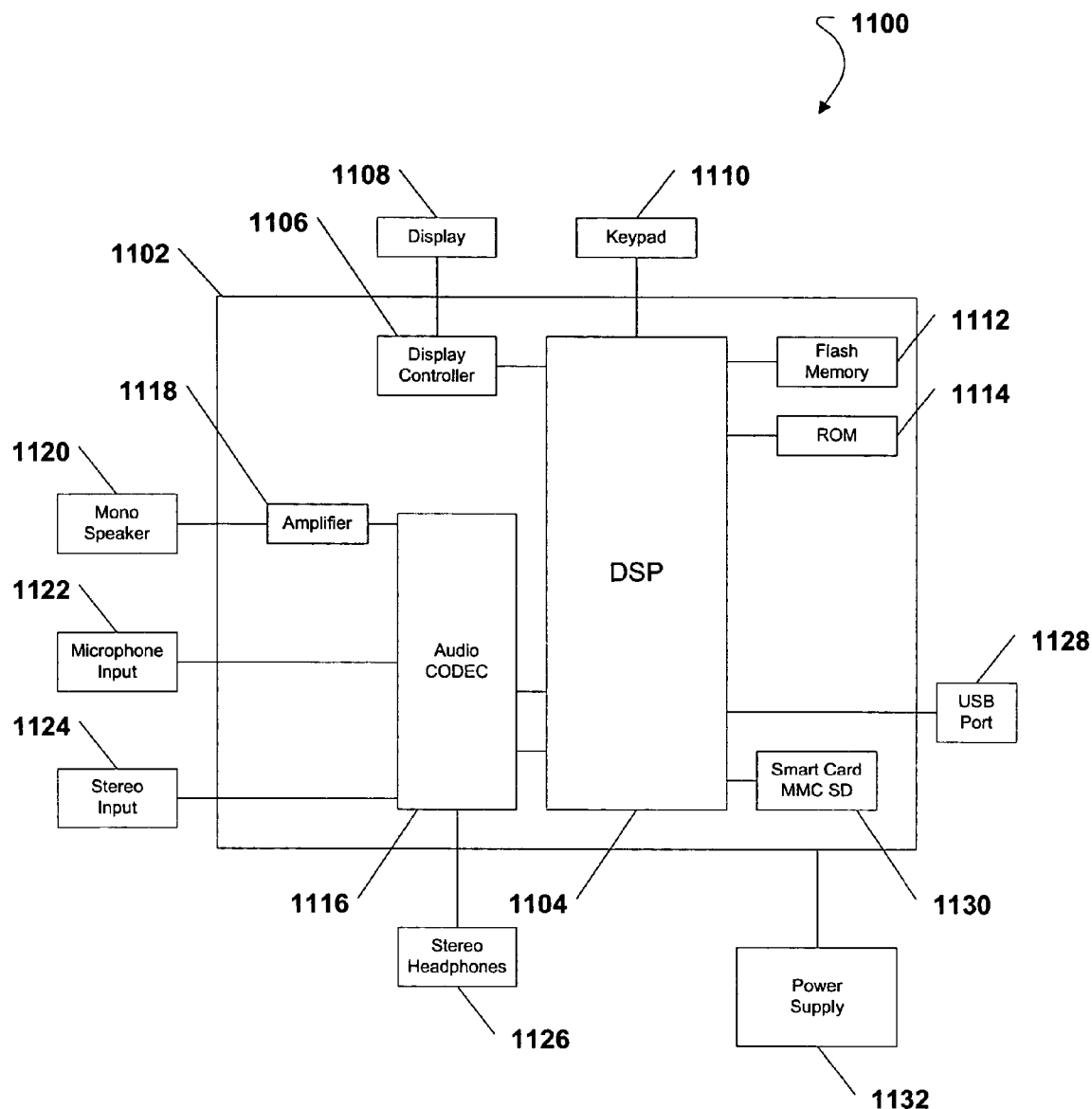
FIG. 11 is a general diagram of an exemplary audio file player incorporating a digital signal processor.

Referring to FIG. 11, an exemplary, non-limiting embodiment of an audio file player, such as moving pictures experts group audio layer-3 (MP3) player is shown and is generally designated 1100. As shown, the audio file player 1100 includes an on-chip system 1102 that includes a digital signal processor (DSP) 1104. In a particular embodiment, the DSP 1104 is the digital signal processor shown in FIG. 1 and described herein. As illustrated in FIG. 11, a display controller 1106 is coupled to the DSP 1104 and a display 1108 is coupled to the display controller 1106. In an exemplary embodiment, the display 1108 is a liquid crystal display (LCD). FIG. 11 further shows that a keypad 1110 can be coupled to the DSP 1104.

As further depicted in FIG. 11, a flash memory 1112 and a read only memory (ROM) 1114 can be coupled to the DSP 1104. Additionally, in a particular embodiment, an audio CODEC 1116 can be coupled to the DSP 1104. An amplifier 1118 can be coupled to the audio CODEC 1116 and a mono speaker 1120 can be coupled to the amplifier 1118. FIG. 11 further indicates that a microphone input 1122 and a stereo input 1124 can also be coupled to the audio CODEC 1116. In a particular embodiment, stereo headphones 1126 can also be coupled to the audio CODEC 1116.

FIG. 11 also indicates that a USB port 1128 and a smart card 1130 can be coupled to the DSP 1104. Additionally, a power supply 1132 can be coupled to the on-chip system 1102 and can provide power to the various components of the audio file player 1100 via the on-chip system 1102.

In a particular embodiment, as indicated in FIG. 11, the display 1108, the keypad 1110, the mono speaker 1120, the microphone input 1122, the stereo input 1124, the stereo headphones 1126, the USB port 1128, and the power supply 1132 are external to the on-chip system 1102. However, each of these components is coupled to one or more components on the on-chip system. Also, in a particular embodiment, the digital signal processor 1104 can use interleaved multithreading, described herein, in order to process the various program threads, including execution linked threads associated with two or more of the different components associated with the audio file player 1100.

With the configuration of structure disclosed herein, the system and method of executing multiple threads in a multithreaded processor provides a way to divide a program having a plurality of virtual very wide very long instruction word instructions into two program threads having a plurality of very long instruction word instructions. Further, the system and method can be used to execute a first program thread in a lock step manner with a second program thread. The system and method can be used to execute any number of program threads in the lock step manner described herein. Also, the system and method can include a way to create a virtual very wide very long instruction word instruction from two or more very long instruction word instructions.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features as defined by the following claims.

What is claimed is:

1. A multithreaded processor device, comprising:
    a first program thread;
    a second program thread;
    wherein the second program thread is execution linked to the first program thread in a lock step manner; and
    a stall controller linked to the first program thread and the second program thread wherein the stall controller is operative to perform a no operation instruction on the first program thread during each clock cycle in which the second program thread experiences a stall event in order to keep the first program thread execution linked to the second program thread and is operative to perform a no operation instruction on the second program thread during each clock cycle in which the first program thread experiences a stall event in order to keep the second program thread execution linked to the first program thread;
    wherein the first program thread comprises a first portion of a program having a plurality of very long instruction words (VLIWs) and the second program thread comprises a second portion of the program having a plurality of VLIWs, and wherein the program having a plurality of VLIWs is divided to form the first and second portions of the program.

2. The device of claim 1, wherein the stall event is caused by a cache miss.

3. The device of claim 1, wherein after the first program thread performs a first successful operation after the stall event, the second program thread restarts normal execution.

4. The device of claim 1, wherein when the second program thread performs a first successful operation after the stall event, the first program thread restarts normal execution.

5. The device of claim 1, further comprising at least one instruction execution unit, the at least one instruction execution unit selectively executing one or more instructions of at least one of the first program thread and the second program thread.

6. The device of claim 5, further comprising a stall controller coupled to at least one instruction execution unit, the stall controller configured to receive a stall event signal from the at least one instruction unit when at least one of the first program thread and the second program thread experiences a stall event.

7. The device of claim 6, wherein the stall controller is configured to output a signal to cause at least one of the first program thread and the second program thread to perform a no operation instruction in response to the stall event signal.

8. The device of claim 7, wherein the stall controller is configured to receive a stall end signal from the at least one instruction unit when at least one of the first program thread or the second program thread performs a first successful operation after the end of a stall state produced by the stall event.

9. The device of claim 8, wherein the stall controller is configured to output a normal execution signal in response to the stall end signal to cause at least one of the first program thread or the second program thread to resume normal execution.

10. A multithreaded processor device, comprising:
a memory;
a sequencer coupled to the memory;
a stall controller within the sequencer;
at least a first program thread within the memory; and
at least a second program thread within the memory;
wherein the stall controller is linked to the at least first program thread and the at least second program thread and wherein the stall controller is operative to perform a no operation instruction on the at least first program thread during each clock cycle in which the at least second program thread experiences a stall event in order to keep the at least first program thread execution linked to the at least second program thread and is operative to perform a no operation instruction on the at least second program thread during each clock cycle in which the at least first program thread experiences a stall event in order to keep the at least second program thread execution linked to the at least first program thread; and
wherein the first program thread comprises a first portion of a program having a plurality of very long instruction words (VLIWs) and the second program thread comprises a second portion of the program having a plurality of VLIWs, and wherein the program having a plurality of VLIWs is divided to form the first and second portions of the program.

11. The device of claim 10, wherein the at least second program thread performs a no operation instruction until the at least first program thread resumes normal execution.

12. The device of claim 11, wherein when the at least second program thread experiences a stall event, the at least first program thread is controlled in order to keep the first program thread execution linked with the second program thread in a lock step mode of execution.

13. The device of claim 12, wherein the at least first program thread performs a no operation instruction until the at least second program resumes normal execution.

14. The device of claim 10, further comprising a control register to indicate execution linking of two or more program threads.

15. The device of claim 14, wherein the control register comprises:
a first thread execution linking register coupled to the control register;
a first field within the first thread execution linking register, the first field associated with a first program thread; and
a second field within the first thread linking register, the second field associated with a second program thread.

16. The device of claim 15, wherein when a value of the first field matches a value of the second field, the first program thread is identified as execution linked to the second program thread and wherein when the value of the first field does not match the value of the second field, the first program thread is not identified as execution linked to the second program thread.

17. The device of claim 16, wherein when the value of the first field matches the value of the second field, the first program thread is executed in a lock step multithreading process with the second program thread.

18. A method comprising:
receiving a program having a plurality of very wide very long instruction word (VLIW) packets, each VLIW packet including a set of instructions;
dividing the program into a first portion to be executed as a first program thread and a second portion to be executed as a second program thread wherein a stall controller, linked to the first program thread and the second program thread, is operative to perform a no operation instruction on the first program thread when the second program thread experiences a stall event in order to keep the first program thread execution linked to the second program thread and is operative to perform a no operation instruction on the second program thread when the first program thread experiences a stall event in order to keep the second program thread execution linked to the first program thread; and
writing data to a thread linking register to indicate that the first program thread is execution linked to the second program thread.

19. The method of claim 18, wherein the first program thread includes a plurality of VLIW packets having a first number of instructions.

20. The method of claim 19, wherein the second program thread includes a plurality of VLIW packets having a second number of instructions.

21. The method of claim 20, wherein the first number of instructions is equal to the second number of instructions.

22. The method of claim 20, wherein each of the plurality of VLIW packets includes eight instructions.

23. The method of claim 22, wherein each of the plurality of VLIW packets of the first program thread includes four instructions and each of the plurality of VLIW packets of the second program thread includes four instructions.

24. A method of operating a digital signal processor device, the method comprising:
using a sequencer, detecting that a first program thread is execution linked to a second program thread;

setting a first program counter to a first instruction of the first program thread;

setting a second program counter to a first instruction of the second program thread; and executing the first program thread in a lock step manner with the second program thread so that each instruction of the second program thread is executed in a super cycle in which a corresponding instruction of the first program thread is executed wherein a stall controller, linked to the first program thread and the second program thread, is operative to perform a no operation instruction on the first program thread during each clock cycle in which the second program thread experiences a stall event in order to keep the first program thread execution linked to the second program thread and is operative to perform a no operation instruction on the second program thread during each clock cycle in which the first program thread experiences a stall event in order to keep the second program thread execution linked to the first program thread;

wherein the first program thread comprises a first portion of a program having a plurality of very long instruction words (VLIWs) and the second program thread comprises a second portion of the program having a plurality of VLIWs, and wherein the program having a plurality of VLIWs is divided to form the first and second portions of the program.

25. The method of claim 24, further comprising detecting that an instruction of the first program thread has experienced a stalled condition and controlling execution of the second program thread to maintain lock step execution between the first program thread and the second program thread.

26. The method of claim 25, wherein the second program thread is instructed to perform a no operation instruction to maintain lock step execution between the first program thread and the second program thread until the first program thread clears the stall condition.

27. The method of claim 25, wherein the second program thread is instructed to stall in order to maintain lock step execution between the first program thread and the second program thread until the first program thread clears the stall condition.

28. The method of claim 25, further comprising detecting that an instruction of the second program thread has experienced a stall condition and controlling execution of the first program thread to maintain the lock step execution between the first program thread and the second program thread.

29. The method of claim 28, wherein the first program thread is instructed to perform a no operation instruction to maintain lock step execution between the second program thread and the first program thread until the second program thread clears the stall condition.

30. The method of claim 28, wherein the first program thread is instructed to stall in order to maintain lock step execution between the second program thread and the first program thread until the second program thread clears the stall condition.

31. A data register to control execution of two or more program threads of a multithreaded processor, the data register comprising:

a first thread execution linked register coupled to a control register to indicate execution linking of a first program thread and a second program thread;

a first field within the first thread execution linked register, the first field associated with a first program thread;

a second field within the first thread linked register, the second field associated with a second program thread; and a stall controller linked to the first program thread and the second program thread wherein the stall controller is operative to perform a no operation instruction on the first program thread when the second program thread experiences a stall event in order to keep the first program thread execution linked to the second program thread and is operative to perform a no operation instruction on the second program thread when the first program thread experiences a stall event in order to keep the second program thread execution linked to the first program thread;

wherein the first program thread comprises a first portion of a program having a plurality of very long instruction words (VLIWs) and the second program thread comprises a second portion of the program having a plurality of VLIWs, and wherein the program having a plurality of VLIWs is divided to form the first and second portions of the program.

32. The data register of claim 31, wherein when a value of the first field matches a value of the second field, the first program thread is identified as execution linked to the second program thread.

33. The data register of claim 32, wherein when the value of the first field matches the value of the second field, the first program thread is identified to be executed in a lock step multithreading process with the second program thread.

34. The data register file of claim 32, wherein the first program thread includes a first very long instruction word (VLIW) having four instructions, wherein the second program thread includes a second VLIW having four instructions, and wherein the first program thread is linked to the second program thread to provide a virtual very wide VLIW having eight instructions.

35. The data register file of claim 34, wherein the virtual very wide VLIW is formed from the first VLIW and the second VLIW.

36. A portable communication device, comprising:

a digital signal processor;

wherein the digital signal processor includes:

a first program thread;

a second program thread;

wherein the second program thread is execution linked to the first program thread, such that when the first program thread experiences a stall event, the second program is controlled to maintain execution linkage to the first program thread;

a stall controller linked to the first program thread and the second program thread wherein the stall controller is operative to perform a no operation instruction on the first program thread during each clock cycle in which the second program thread experiences a stall event in order to keep the first program thread execution linked to the second program thread and is operative to perform a no operation instruction on the second program thread during each clock cycle in which the first program thread experiences a stall event in order to keep the second program thread execution linked to the first program thread; and wherein the first program thread comprises a first portion of a program having a plurality of very long instruction words (VLIWs) and the second program thread comprises a second portion of the program having a plurality of VLIWs, and wherein the program having a plurality of VLIWs is divided to form the first and second portions of the program.

37. A computer code assembler device, comprising:

means for receiving a program having a plurality of very wide very long instruction words (VLIWs);

means for dividing the program into a first portion to be executed as a first program thread and a second portion to be executed as a second program thread wherein a stall controller, linked to the first program thread and the second program thread, is operative to perform a no operation instruction on the first program thread when the second program thread experiences a stall event in order to keep the first program thread execution linked to the second program thread and is operative to perform a no operation instruction on the second program thread when the first program thread experiences a stall event in order to keep the second program thread execution linked to the first program thread; and means for indicating that the first program thread is execution linked to the second program thread.

38. A digital signal processor device, comprising:

means for detecting that a first program thread is execution linked to a second program thread;

means for setting a first program counter to a first instruction of the first program thread;

means for setting a second program counter to a first instruction of the second program thread; and means for executing the first program thread in a lock step manner with the second program thread so that each instruction of the second program thread is executed in a super cycle in which a corresponding instruction of the first program thread is executed wherein a stall controller, linked to the first program thread and the second program thread, is operative to perform a no operation instruction on the first program thread during each clock cycle in which the second program thread experiences a stall event in order to keep the first program thread execution linked to the second program thread and is operative to perform a no operation instruction on the second program thread during each clock cycle in which the first program thread experiences a stall event in order to keep the second program thread execution linked to the first program thread;

wherein the first program thread comprises a first portion of a program having a plurality of very long instruction words (VLIWs) and the second program thread comprises a second portion of the program having a plurality of VLIWs, and wherein the program having a plurality of VLIWs is divided to form the first and second portions of the program.

\* \* \* \* \*